United States Patent [19]
Aulich et al.

[11] 3,990,163
[45] Nov. 9, 1976

[54] APPARATUS FOR THE PREPARATION OF SEAMS WHICH ARE TO BE PRESSED

[75] Inventors: Gunter Aulich; Klaus Bacher; Werner Bogatz; Wilhelm Rosel, all of Wittenberge, Germany

[73] Assignee: VEB Nahmaschinenwerk Wittenberge, Wittenberge, Germany

[22] Filed: July 28, 1975

[21] Appl. No.: 599,903

Related U.S. Application Data

[63] Continuation of Ser. No. 589,988, June 24, 1975, abandoned.

[30] Foreign Application Priority Data

June 24, 1974 Germany.............................. 179401

[52] U.S. Cl................................................. 38/1 B
[51] Int. Cl.² ........................................... D06F 69/00
[58] Field of Search................ 112/217, 63, 121.29, 112/136, 211, 214, 203, 121.24, 147, 148, 138, 153; 38/1 B, 2, 16, 17; 223/73

[56] References Cited
UNITED STATES PATENTS

| 2,307,623 | 1/1943 | Gardner ................................ 38/1 B |
| 2,753,823 | 7/1956 | Judelson ............................ 112/217 |
| 3,246,616 | 4/1966 | Korioth................................... 38/2 X |
| 3,366,292 | 1/1968 | Thompson ............................. 223/73 |
| 3,372,497 | 3/1968 | Sigoda ..................................... 38/2 |
| 3,865,285 | 2/1975 | McCormack et al. ................ 223/73 |
| 3,881,264 | 5/1975 | Grazzino ............................. 38/1 B |

Primary Examiner—G. V. Larkin
Attorney, Agent, or Firm—Nolte and Nolte

[57] ABSTRACT

Apparatus for opening and spreading the legs of a seam joining two fabric parts, preparatory to the pressing of the legs of the seam, comprising a first rail having an edge against which the legs of the seam are to be guided, a second rail parallel to the plane in which the pressing is to be effected and having an edge against which the sewn together fabric parts are to be tensioned, the edge of the first rail being spaced from the edge of the second rail toward the center of the second rail by a distance at least equal to the length of one of the legs, the edge of the first rail extending at an angle of from 60°–90° toward the second rail, the edge of the first rail being at a distance from the second rail predetermined by the thickness of the fabric parts, arranged at the side of the first rail facing away from the guiding edge of the first rail, means for driving the fabric parts toward the pressing means and obliquely away from the first rail, the means thereby exerting a component of force transversely to the direction of transport of the fabric parts as well as a component of force in the direction of transport of the fabric parts and immediately adjacent the terminus of the first rail in the direction of transport of the fabric parts, a seam opener and a seam spreader.

11 Claims, 8 Drawing Figures

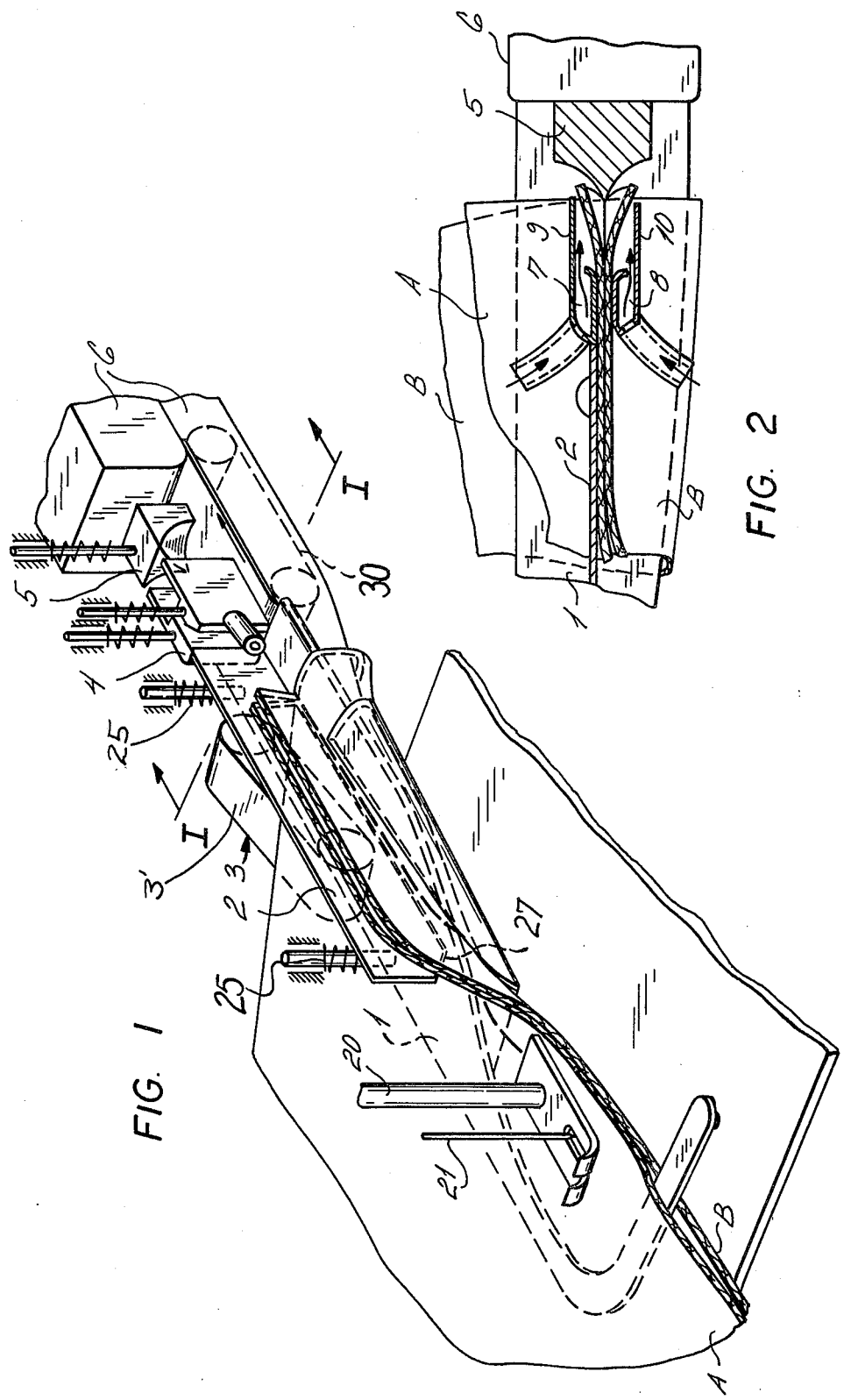

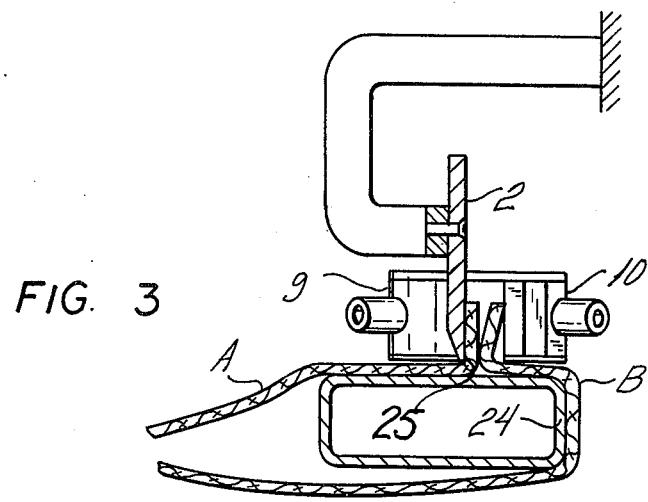
FIG. 3
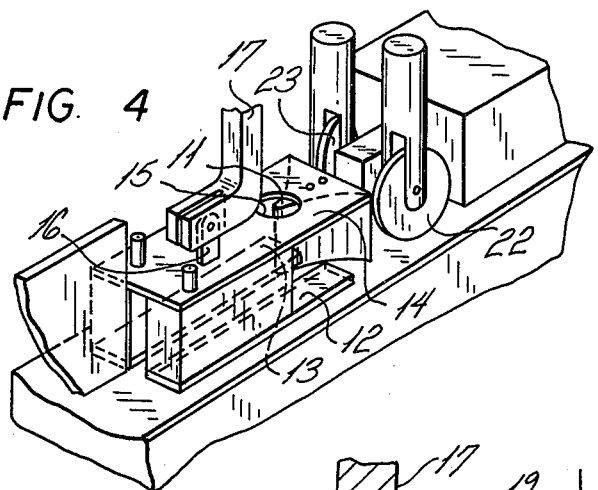
FIG. 4
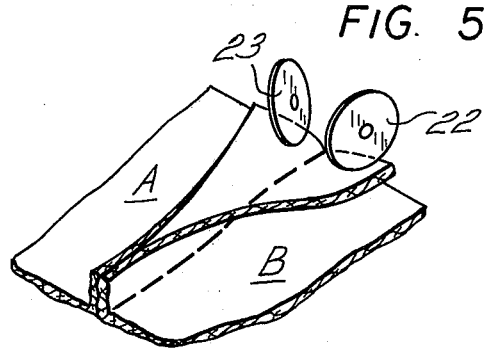
FIG. 5
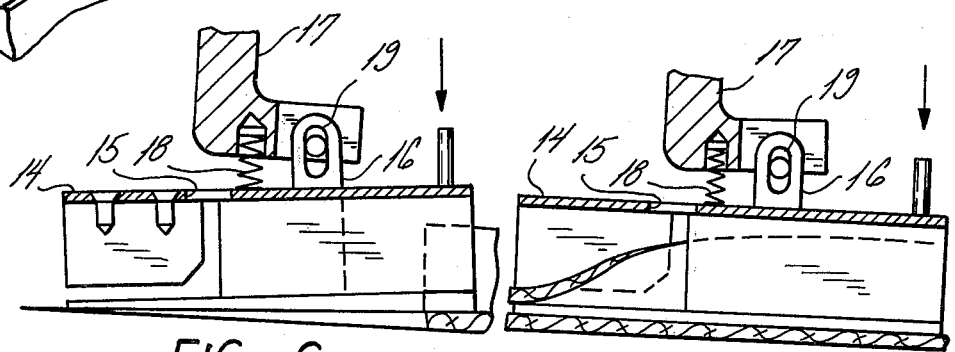
FIG. 6
FIG. 7
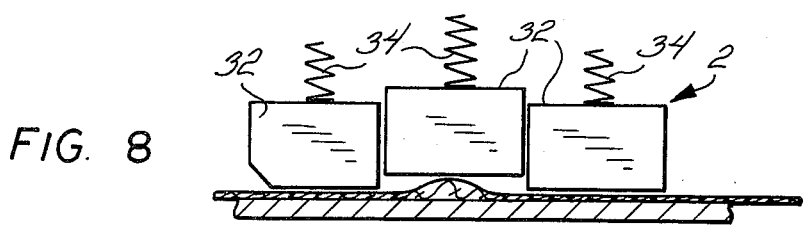
FIG. 8

APPARATUS FOR THE PREPARATION OF SEAMS WHICH ARE TO BE PRESSED

REFERENCE TO RELATED APPLICATIONS

This is a continuation of Ser. No. 589,988, filed June 24, 1975, now abandoned.

BACKGROUND OF THE INVENTION

This invention relates to an apparatus for the preparation of seams which are to be pressed. More particularly, the apparatus is to be used on pressing machines and, especially, in machines which are a combination of pressing machines and sewing machines.

Pressing machines for the pressing of seams are known in which the legs of the seam must be opened and folded manually. In most cases, stabilization by means of a hand pressing iron is needed. Afterwards, the item having the seam is introduced into the pressing machine and pressed. Manual preparation of the seam for pressing adds to the time and, hence, the cost of the entire operation.

An improvement was provided in the prior art in the form of so-called "throughput pressers" which operate either continuously or intermittently. The throughput pressers usually consist of two rotary transporting bands which are pressed against each other, one of the bands being provided outside the pressing zone with an elongation for the correct feeding of the fabric items. In these machines, a pressing foot is lowered upon the seam after the seam legs are separated manually, the foot continuously folding the seam legs which, of course, are short, during the further transport of the fabric.

While this latter type of machine is an improvement in that less expenditure of time is required, nonetheless a large amount of manual labor is still necessary. Moreover, when pressing a curved seam with these machines, manual assistance is still needed because there are no guiding means. The absence of a suitable guiding means is particularly noticeable when a sewing means is combined with the pressing machine.

Consequently, in the prior art, there exist a number of apparatuses which make it possible to directly couple the sewing means and the pressing machine, thereby making continuous operation possible. Basically, each of these apparatuses includes two guide rails, disposed on opposite sides of the fabric pressing foot, the guide rails being parallel to the working plane of the sewing machine and perpendicular to the pressing plane. At the ends of the rails facing the sewing machine are located both pressing surfaces at a predetermined distance from the working plane of the sewing machine. The guide rails form a vertical plane just before the transition to the pressing elements, which causes the folding over of the short legs of the seam onto the respective fabric parts. It is assumed that well-known transport means will guide the fabric parts along the rails without distorting the fabric parts.

A disadvantage of the latter apparatus is the position of the guide rails immediately adjacent the fabric pressing foot. This is particularly disadvantageous in the case of the guide rail at the right side of the fabric pressing foot because the right rail must be located extremely close to the foot in order to assure secure guiding of the relatively short legs of the seam. Consequently, it is very difficult to put the fabric parts underneath the pressing foot. Moreover, the seam legs tend to slip out of the guide because the seam legs are relatively short. A relatively narrow guide slot is needed for the seam in order to prevent such a slipping but such a slot is not good for the transport of fabric parts which are connected by curved seams. In particular, the narrow slot offers considerable resistance to the seam because relative to the curvature of the seam it is geometrically a chord.

SUMMARY OF THE INVENTION

It is an object of the present invention to provide an apparatus including a pair of rails for the guiding of the seam and means for the folding of the seam legs which apparatus does not have the aforementioned disadvantages of the prior art and assures a perfect guiding of the fabric parts by the seam even when the seam is curved and which permits the machine operator to readily introduce the fabric parts into the machine.

Other objects and advantages of the invention will be apparent to one skilled in the art from a reading of the following description of the invention.

According to the invention, the guide rails are arranged adjacent the sewing zone in such a way that accessibility to the sewing zone is not restricted and automatic positioning of the fabric parts and opening and spreading of the seam legs is assured. Moreover, the apparatus of the invention is usable on conventional continuous pressing machines without major changes in the machines.

More particularly, according to the invention, there is provided a first rail having an edge against which the legs of the seam are to be guided, a second rail in a plane transverse to the plane of the first rail and parallel to the pressing plane, the second rail having an edge against which the sewn together fabric parts are to be tensioned, the edge of the first rail being spaced from the edge of the second rail toward the center of the second rail by a distance at least equal to the length of one of the legs of the seam, the edge of the first rail extending at an angle between 60° and 90° toward the second rail, the edge of the first rail forming with the edge of the second rail a slot the width of which is equal to the thickness of the fabric parts which were sewn together to form the seam. Adjacent the side of the first rail facing away from the guiding edge of the first rail is arranged a driving means which is oriented obliquely relative to the first rail so that the driving means exerts upon the sewn together fabric parts a component of force transverse to the direction of transport of the fabric as well as a component of force in the direction of transport of the fabric and, immediately thereafter, seam opening and spreading devices for opening and spreading out the seam legs preparatory to pressing thereof.

According to another feature of the invention, the opener is in the form of gas, generally air, jets and means for forming the gas into planar gas streams adjacent and parallel to the outer faces of the legs of the seam. At each of the aforementioned faces, a slot acts as an opening for the gas, the slot extending over the whole width of the leg of the seam and becoming broader immediately prior to its exit terminus. The opener is shaped in such a way that, practically, it forms a unit with a subsequent spreader. This is done by forming the plate defining the top of the spreader with an elongation. The plate forming the lower part of the spreader is provided with two toe-shaped surfaces which smoothly guide the seam legs. According to yet another aspect of the invention, the upper plate of the spreader is provided with a throughhole.

It is advantageous that the opener and the spreader be arranged in a vertically adjustable manner in order to facilitate insertion of the fabric. According to the invention, to this end, an ear is provided at the upper limiting plane, the ear being provided with a slot which receives a pin of a bearing member, a compression spring is arranged between the opener and the bearing member, the spring thereby providing for the opener a slit which enlarges to accommodate fabric being fed.

According to yet another aspect of the invention, the spreader is provided with at least two rollers which are oriented outwardly relative to the direction of transport.

Another feature of the invention is the arrangement of a drive device consisting of well-known roller or belt drives at a predetermined angle to the direction of transport.

It is advantageous to fix the first rail rigidly at a predetermined distance from the second rail. However, it is also possible to let the first rail rest with its own weight or under the pressure of a spring upon the second rail, in which case the first rail must be vertically movable. In this instance, the first rail may consist of segments in order that occasional thick spots in the fabric may be accomodated.

The apparatus of the present invention assures the turning of the seam legs for correct pressing while not causing any inconvenience for the machine operator while the operator puts the fabric parts into the machine. Moreover, this arrangement assures a secure positioning of the seam as it is fed toward and into the pressing zone, the seam legs being opened and spread without any action by the operator. Furthermore, it is of no consequence whether the seam is straight or curved or consists of a combination of straight and curved portions.

While the invention is in no way limited for use with a particular throughput pressing machine, it is particularly useful for use in a combination of a sewing machine and a pressing machine.

The invention will now be further explained by reference to a specific embodiment thereof, as illustrated in the drawings. The illustrated embodiment is a combination of a sewing machine and a pressing machine. This combination was selected in order to simplify the explanation of the invention. However, as pointed out above, the invention is not limited to this area of application.

BRIEF DESCRIPTION OF THE DRAWINGS

FIG. 1 is a partially schematic isometric view of the entire apparatus;

FIG. 2 is a plan view, partly in section, of the seam opener and the spreader of FIG. 1;

FIG. 3 is a section taken on section line I—I of FIG. 1;

FIG. 4 is a partly schematic isometric view of another embodiment of the invention, including a seam opener and a seam spreader and means for imposing lateral forces upon the seam legs;

FIG. 5 is a schematic isometric view of the oblique wheels illustrated in FIG. 4, the purpose of FIG. 5 being to show how the wheeels act;

FIG. 6 is a lengthwise sectional view of a portion of the apparatus of FIG. 4 showing the position of the seam opener and seam spreader when the fabric enters;

FIG. 7 corresponds to FIG. 6 but illustrates the position of the seam opener and seam spreader after the fabric has left; and FIG. 8 shows a detail of a variation of the apparatus in FIG. 1.

DESCRIPTION OF THE PREFERRED EMBODIMENTS

With reference to FIG. 1, the apparatus 4 positioning, opening and spreading the short seam legs in such a way that they lie upon the fabric preparatory to pressing is located between the sewing zone, which is defined by the fabric presser foot 20 and the needle 21, and the pressing apparatus 6 defining the pressing zone. The aforementioned apparatus consists of a rail 1 which is parallel to the pressing plane, another rail 2 disposed at a predetermined angle relative to the pressing plane and having a guiding edge 25, a driving means 3 also arranged at a predetermined angle to the pressing plane, a seam opener 4 and a seam spreader 5. The rail 1 receives the fabric parts A and B, which are connected by a seam which has been formed by the sewing machine. The rail 1 is arranged at a distance from the sewing means of the sewing machine, the distance being predetermined by the thickness of the fabric. Preferably, the rail 1 is in the form of a U-shaped lever, as illustrated, which partly circumscribes the sewing zone, in order that hosiery shaped parts may be sewn without hindrance.

The rail 2 is oriented preferably 60°–90° and most preferably 90° relative to the pressing plane. The edge 25 of rail 2 is spaced, by a predetermined distance relative to the edge 24 of the rail 1, inwardly toward the center of rail 1. The spacing is preferably equal to at least the length of one of the legs. The rail 2 together with the rail 1 forms a gap, through which the fabric part A which was sewn together with the fabric part B in the sewing zone extends toward the left. The rail 2, alternatively, may rest under its own weight or under the pressure of a spring 21 against the rail 1. Entrance of the fabric part A is facilitated by the provision of a bevel 27. The fabric B wraps around the rail 1 (FIGS. 1 and 3) and also extends toward the left.

The driving device indicated generally at 3 assists the transport of the fabric parts A and B from the sewing machine as soon as the fabric parts A and B reach the device. As can be seen in FIG. 1, the device 3 consists of an endless belt 3' trained over a pair of rollers, at least one of which is driven by means which are not illustrated. While the device 3 transports the fabric parts toward the seam opener and the seam spreader, the device also exerts a sideward pull upon the fabric parts so that the fabric parts move toward the rail 2 until the seam reaches the area of the guiding edge of the rail 2. This is a consequence of the angular orientation of the driving device.

With reference to FIG. 3, it is seen that the seam legs are raised by the resistance of the legs being pulled against the rail 2. This effect is aided by the edge 24 of the rail 1 which assists in providing the transverse tensioning necessary for the effect. Simultaneously, the legs slide along the rail 2 into the opener 4. The edge 24 of the rail 1 initially extends laterally only slightly beyond the guiding edge of the rail 2 and increases only gradually to the breadth needed for pressing. The purpose of this configuration is to reduce the amount of force needed to pull the seam legs toward the rail 2.

A pair of nozzles 7, 8 are arranged on opposite sides of the transport path with the exit opening of the nozzles being directed in the same direction as the transport of the fabric. The openings are elongated so that the air or other gas ejected through the nozzles 9, 10 flows in a planar configuration parallel to a respective leg of the seam (FIG. 2). Consequently, at the sides of the legs, a negative pressure is created which opens the legs.

The spreader 5 immediately follows the opener. The spreader separates the legs further and folds them over so that the legs rest upon the respective fabric parts A and B, in which position the legs can now be pressed.

To provide a smooth transition from the opener to the spreader and, in effect, make the two devices a single unit, a projection 11 extending into the opening zone of the opener may be provided (FIG. 4). Moreover, toe-like projections 12, 13 below the opener, which partly encircle the spreader, assist the opening and guiding of the seam legs. Moreover, a connecting plate 14 is provided above both nozzles. The plate has a through-hole 15 in immediate proximity to the projection 11. The opening of the seam legs is assisted by the drawing of air through the hole as the air streams move along planes 9, 10.

As illustrated in FIG. 1, it is preferred to mount the opener 4 and the spreader 5 so that they are vertically movable in order to conform to irregularities in the thickness of the fabric.

In the particularly advantageous arrangement of FIG. 4, the opener and spreader form one unit which is fastened to the bearing member 17 by means of an ear 16. A spring 18 (FIGS. 6 and 7), arranged at a suitable distance from the ear 16, causes the opener to assume the position illustrated in FIG. 6 whereby correct feeding of the fabric parts is assured. The opener flips into the horizontal position of FIG. 7 as soon as the fabric parts are completely underneath the opener. The slot 19 in the ear 16, in which is received a pin mounted in the bearing member, permits the necessary vertical displacement.

At least two obliquely outwardly directed wheels 22, 23 are arranged following the spreader 5 (FIGS. 4 and 5). The wheels 22, 23 exert a lateral pull upon the seam legs, thereby assuring perfect pressing of the base of the seam.

In order to provide adequate frictional engagement between the fabric and the apparatus of the invention, transporting means 30 in the form of a belt drive is provided beneath the seam leg opener and spreader.

In the embodiment of FIG. 8 an alternative form of the first rail 2 is shown in which the rail is made up of a plurality of segments 32 each having spring means 34 associated therewith so that the segments may move vertically to accommodate irregularities in thickness of the fabric as, for example, the thickened portion below the central segment in the drawing. It will be appreciated that the weight of the segments may, in certain instances, be sufficient to hold the segments against the fabric and in that case the spring means may be omitted.

Modifications of and departures from the illustrated embodiment are, of course, possible. For example, the rail 1 may form the basic plane of the apparatus, connected in tandem to a conventional throughput press. This machine may be fed by hand. The operator pushes the fabric parts under the rail whereupon the fabric parts are automatically pulled into the pressing machine as soon as they are gripped by the driving device.

What is claimed is:

1. Apparatus for opening and spreading the legs of a seam joining two fabric parts, preparatory to the pressing of the legs of the seam, comprising a first rail having an edge against which the legs of the seam are to be guided, a second rail parallel to the plane in which the pressing is to be effected and having an edge against which the sewn together fabric parts are to be tensioned, said edge of the first rail being spaced from said edge of the second rail, toward the center of the second rail, by a distance at least equal to the length at one of the legs, the first rail extending toward the second rail at an angle of from 60°–90° relative to the second rail, said edge of the first rail being at a distance from the second rail determined by the thickness of the fabric parts, drive means, disposed on the side of the first rail opposite to that side thereof upon which said guiding edge of the second rail is disposed, said drive means driving the fabric parts toward the pressing means and at an angle away from the first rail, said drive means thereby exerting a component of force transversely to the direction of transport of the fabric parts as well as a component of force in the direction of transport of the fabric parts and, adjacent the terminus of the first rail, in the direction of transport of fabric parts, a seam opener and a seam spreader.

2. Apparatus according to claim 1, in which the seam opener comprises means for directing planar streams of gas parallel to the respective outer faces of the seam legs, whereby a negative pressure is created at said faces thereby causing said legs to separate.

3. Apparatus according to claim 2, in which the opener and the spreader are combined to form a unit having an opening zone followed by a spreading zone.

4. Apparatus according to claim 3, in which the combined opener and spreader includes a lower limiting plate having projections which assist the opening and spreading of the seam legs and the guiding of the seam legs from the opening zone to the spreading zone.

5. Apparatus according to claim 3, in which an upper limiting plate connects the opener and spreader and has a projection depending therefrom shaped for assisting the opening and spreading of the seam legs and a hole is provided through said upper limiting plate immediately above said projection, air being drawn through said hole to assist the opening and spreading of the seam legs.

6. Apparatus according to claim 2, in which the opener and spreader are movable vertically relative to the pressing plane.

7. Apparatus according to claim 5 in which the upper limiting plate is provided with a lug, a bearing member having a pins is arranged above said plate, an elongated slot is provided in the lug and said pin is received in said slot so that the plate is movable toward and away from the bearing member and a spring is arranged between the bearing member and the plate at a point spaced from the lug so that the spring tends to pivot the plate about the connection between the lug and the bearing member.

8. Apparatus according to claim 1, further comprising after the spreader two wheels oriented obliquely away from the apparatus in the direction of transport to engage the legs during the spreading thereof and thereby to assist the spreading thereof.

9. Apparatus according to claim 1, in which the drive means comprises a belt drive.

10. Apparatus according to claim 1, in which the first rail is segmented.

11. Apparatus according to claim 10, further comprising spring means biasing the respective segments of the first rail against the second rail.

* * * * *